(22.)
HENRY A. LEE.
Improvement in Flanged Collars for Brooms.
No. 4,706. Reissued Jan. 9, 1872.
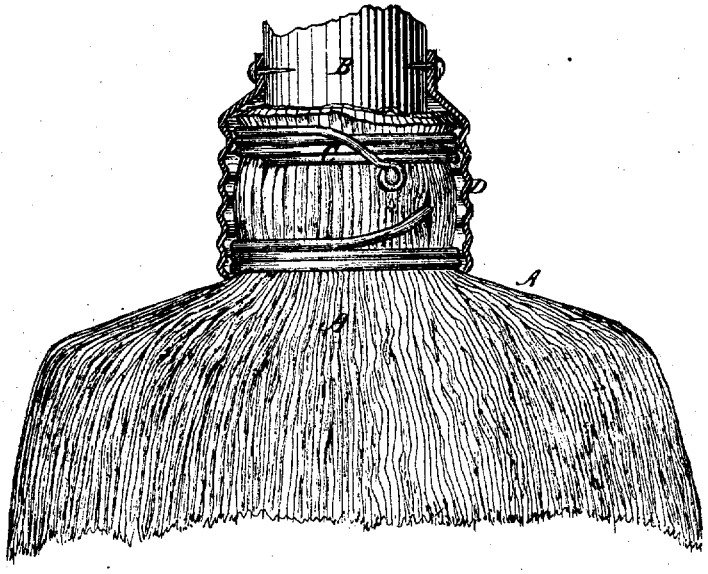
Witnesses:-
W. H. Rowe,
Baltis & Long
Henry A. Lee
by his Atty
Wm. D. Baldwin
AM. PHOTO-LITHOGRAPHIC CO. N.Y. (OSBORNE'S PROCESS.)

UNITED STATES PATENT OFFICE.

HENRY ALPHEUS LEE, OF NEW YORK, ASSIGNOR OF ONE-HALF HIS RIGHT TO JOHN F. LEE, JR., OF BROOKLYN, N. Y.

IMPROVEMENT IN FLANGED COLLARS FOR BROOMS.

Specification forming part of Letters Patent No. 119,775, dated October 10, 1871; reissue No. 4,706, dated January 9, 1872.

*To all whom it may concern:*

Be it known that I, HENRY ALPHEUS LEE, of 85 Murray street, New York city, have invented a new and useful Improvement in Collars for Brooms, of which the following is a specification:

My invention relates to brooms of that class in which a cap or collar is employed. In such brooms, as constructed prior to the date of my application, so far as my knowledge extends, the butts of the corn always have been crowded into or compressed by the collar or some other instrumentality connected therewith. Now, experience has demonstrated that brooms can be made with wire for binding the butts to the handle in a better and more economical manner than in any other way. A difficulty incident to this class of brooms, however, as heretofore constructed, has been that, no matter how tightly the wire may be drawn at first, it is liable to become loosened by the shrinking of the broom-corn and to slip up on the handle, thereby loosening the butts and destroying the broom. It is the object of my invention to remedy this defect and to produce a cheap and durable broom, to which end my improvement consists in covering the binding-wire with a collar or cap, which prevents the wire from slipping from the stalks. I thus give the broom a neat ornamental appearance, and also am enabled to use a less expensive kind of binding-wire than heretofore has been employed.

The accompanying drawing represents a portion of an ordinary wire-bound broom, to which my improvement is applied. The construction of such a broom being well known, a description of it is deemed unnecessary here. The corn A is secured to the handle B by a binding-wire, C, in the usual way. Brooms of this class always taper from the neck to the handle, as shown in the drawing, and are beveled at their upper edge to give a neat finish. In my broom the ends of the butts may be beveled in the ordinary manner, or may be left square. I prefer the latter, as it furnishes an additional safeguard against the slipping of the wire, is cheaper, and does not affect the appearance of the broom, as the ends are covered by the cap. I also use ordinary wire instead of tinned wire, as when thus protected it does not show, is protected from rust, and is equally effective and durable as if tinned or plated. A cap or collar, D, by preference struck or spun up from sheet metal, fits snugly around the handle, being flared or flanged so as to cover the ends of the butts and the binding-wire and prevent the latter from slipping over the ends of the former as the corn dries and shrinks. The collar is pressed snugly down upon the wire and fastened by a tack driven transversely into the handle, or in other equivalent well-known ways. This cap may be corrugated or otherwise ornamented, or may be left plain, as may be desired. I prefer the corrugated form, however, as it is stronger and gives a neater finish to the broom. Experience has demonstrated that my invention produces a cheap, lasting, ornamental, and effective broom.

I disclaim binding a broom with wire as well as a cap or socket into which the corn is compressed, as both of these constructions, *per se*, are old; but I am not aware that prior to my invention any wire-bound broom had been protected by a collar fitting snugly against the wire which binds the corn to the handle.

I claim as my invention—

1. The combination, with a wire-bound broom, of a collar fitting snugly over the binding-wire to prevent it from slipping, substantially as described.

2. A cap or collar, constructed, substantially as set forth, to adapt it for attachment to a broom.

HENRY ALPHEUS LEE.

Witnesses:
JAMES H. NOE,
JAMES L. PEREGO.

(22)